(12) United States Patent
Saxena

(10) Patent No.: US 7,958,540 B2
(45) Date of Patent: Jun. 7, 2011

(54) METHOD FOR CONDUCTING REAL-TIME EXECUTION OF TRANSACTIONS IN A NETWORK

(75) Inventor: Ashutosh Saxena, Hyderabad (IN)

(73) Assignee: Infosys Technologies Ltd., Bangalore (IN)

( * ) Notice: Subject to any disclaimer, the term of this patent is extended or adjusted under 35 U.S.C. 154(b) by 822 days.

(21) Appl. No.: 11/953,518

(22) Filed: Dec. 10, 2007

(65) Prior Publication Data

US 2008/0184356 A1    Jul. 31, 2008

(30) Foreign Application Priority Data

Dec. 11, 2006   (IN) .............................. 2290/CHE/2006

(51) Int. Cl.
*H04L 9/32* (2006.01)

(52) U.S. Cl. ...................................... 726/2; 726/4; 726/9
(58) Field of Classification Search .................. 713/168, 713/170, 172, 178, 182–185, 192–194; 726/2–5, 726/8–9, 20–21; 380/44
See application file for complete search history.

(56) References Cited

U.S. PATENT DOCUMENTS 5,778,071 A * 7/1998 Caputo et al. ................. 713/159
* cited by examiner

*Primary Examiner* — Hosuk Song
(74) *Attorney, Agent, or Firm* — Klarquist Sparkman, LLP

(57) ABSTRACT

The present invention provides a method, system and computer program product for registering and authenticating a user using a processor card with the server. The method enables the user to create his login details. Further, the method enables the authentication of the user over a public network. The method also enables the user to change the login details without accessing the server.

20 Claims, 6 Drawing Sheets

METHOD FOR CONDUCTING REAL-TIME EXECUTION OF TRANSACTIONS IN A NETWORK

BACKGROUND

The present invention relates generally to authentication of a user with a server. More specifically, it relates to a method and system for registration and authentication of the user using a processor card with the server over a public network.

Users access the Internet on a daily basis for various services such as banking services, online bookings, financial transactions, etc. These services are provided by the servers hosted by each service provider. The users, in order to avail such services and to maintain data security, have to get registered with the servers that provide these services. Presently, the user identification and password details are sent to the users either by a post or an email, and they are allowed to access the server only after receiving these login details. Hence, there is a possibility of intercepting the login details, termed as a forgery attack. The login details, once intercepted, can be used by the unauthorized people repeatedly to access to the server, resulting in a replay attack.

Further, in order to access the server, the user gets authenticated by the server based on his login details. Lamport first introduced the hash based password authentication system to avoid the guesswork for passwords by unauthorized people. However, the required computation increases the computational load on the server. Furthermore, the server maintains all the login details of the user required for authentication, consuming various resources at the server. Maintaining the login details of the users at the server may also suffer from an insider attack, whereby the login details may be intercepted and the server may be accessed by unauthorized people. To overcome the problems of computational load and security, the users are provided with a processor card, for example, a smart card, in addition to the passwords for authentication purposes. The processor card provides an efficient way of hash-function based authentication, and decreases the computational load on the server for decrypting the password. However, the registration of the processor card with the server requires an offline channel, and the login details have to be sent to the users either through a post or an email. The offline channel generally includes filling various forms provided by the service providers so as to register the user with the server. Also, the server requires a secure channel for authenticating the user using the processor card. The requirement of a secure channel further increases the utilization of resources at the server.

Modern authentication systems also involve the login details resetting problems. Login details are initially selected at the server, and are thereby provided to the users. Later, the users are provided with the options of changing the login details according to their preferences. Since, the login details are maintained at the server, a user has to send his preferred login details to the server, before he can use them for subsequent authentications. Further, a secure channel is required for sending these login details to the server in order to avoid forgery attacks.

In light of foregoing discussion, there is a need for a method and a system which may decrease the computational load on the server and enhance the security level during a transaction with the server. Further, the method should also obviate the need of any offline or secure channel for both, registration and authentication. Furthermore, the method should eliminate the need of storing the login details at the server and in turn, decrease the utilization of resources at the server.

SUMMARY

An object of the invention is to register a user using a processor card with the server.

Another object of the invention is to authenticate a user with the server over a public network.

Yet another object of the invention is to enable a user to change login details of the user without accessing the server.

In various embodiments of the invention, a user uses a processor card that includes the security parameters of the server and its own identification details. During the registration process, the user enters a user-preferred information in the processor card to be stored as his login details. These login details, the security parameters and the identification details are together used to generate a secure identity. The user is registered with the server after the secure identity is sent to the server and is validated by the server.

Further, the user uses the processor card to access the server. The processor card generates a dynamic login request on being accessed by the user to access the server. The user sends this dynamic login request to the server over a public network. The server validates the dynamic login request based on the security parameters and the time validity of the dynamic request.

Furthermore, in accordance with an embodiment of the invention, the user changes the login details without accessing the server. The user can change the login details upon entering the existing login details and new login details to be stored in the processor card.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION OF DRAWINGS

The invention describes a method, system and computer program product for registering a user with a server. Further, the invention also describes a method, system and computer program product for authenticating the user with the server over a public network without compromising on security. The user uses his login details and a processor card to register and get authenticated with the server. In an embodiment of the invention, the public network may be the Internet.

Figure 1:
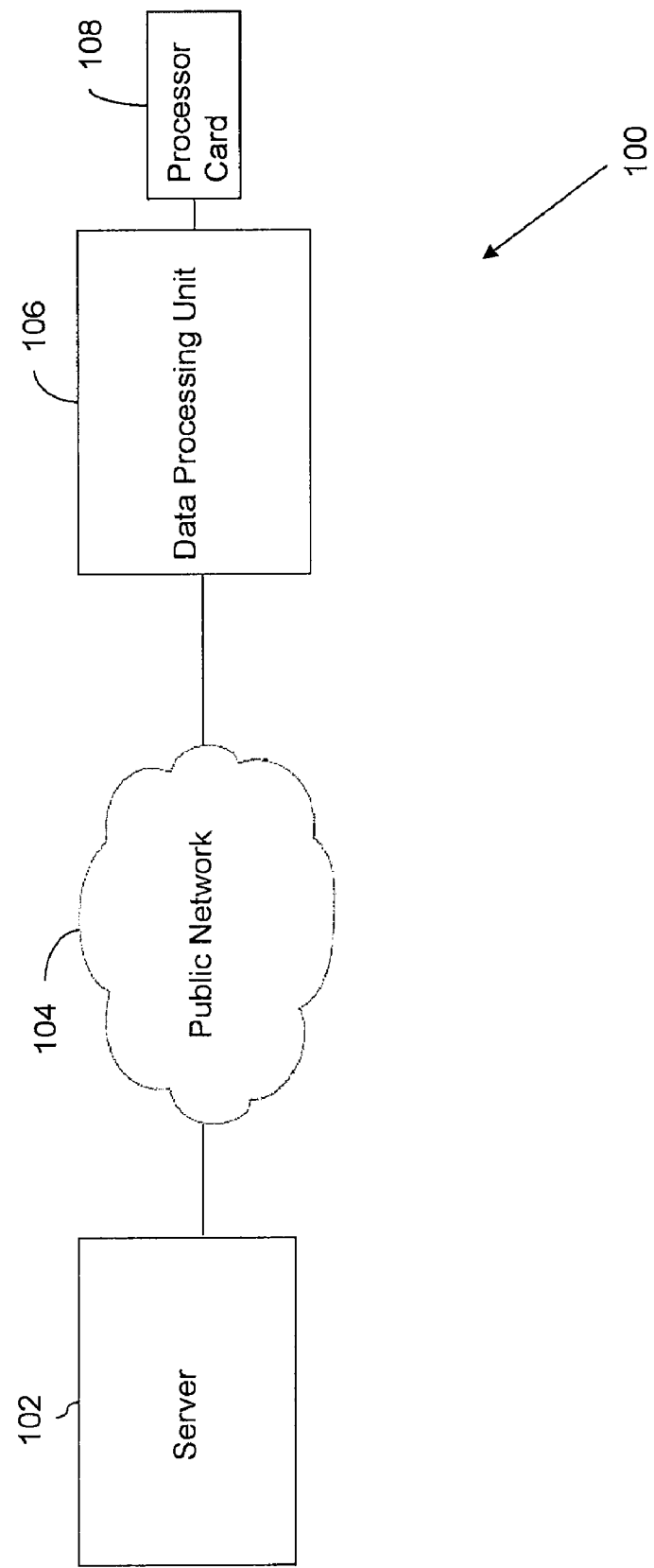
FIG. 1 illustrates an environment in which various embodiments of the invention may be practiced.

FIG. 1 illustrates a network 100 in which various embodiments of the invention may be practiced. Network 100 includes a server 102, a public network 104, a data processing unit 106 and a processor card 108.

Server 102 is accessed by a user through public network 104. In various embodiments of the invention, server 102 may be a remote server connected to various application servers; an application server, and the like. In an embodiment of the invention, public network 104 may be the Internet, an intranet, a Local Area Network (LAN), a Wide Area Network (WAN), a Wireless Local Area Network (WLAN), and the like.

The user accesses server 102 through data processing unit 106. In an embodiment of the invention, the user and server 102 may be present at two different geographical locations. In another embodiment of the invention, the user and server 102 may be present at the same geographical location.

Server 102 authenticates the user before providing him any access. Processor card 108 computes a login request for the user to provide him access to the server based on the certain security parameters stored in processor card 108 and his login details. This login request is sent to server 102 for authentication.

In various embodiments of the invention, processor card 108 includes a memory and an inbuilt microprocessor. In various embodiments of the invention, processor card 108 is be accessed by the user by using data processing unit 106.

In various embodiments of the invention, data processing unit 106 may be a computer, Personal Digital Assistant (PDA), a smart card reader, a processor card reader, a microprocessor card reader, a communication device, a navigational device, and the like. In various embodiments of the invention, processor card 108 may be a smart card, a chip card, integrated circuit microprocessor card, integrated circuit memory cards, optical memory cards, a memory card, contactless smart card, a micro processor card, and the like.

Figure 2:
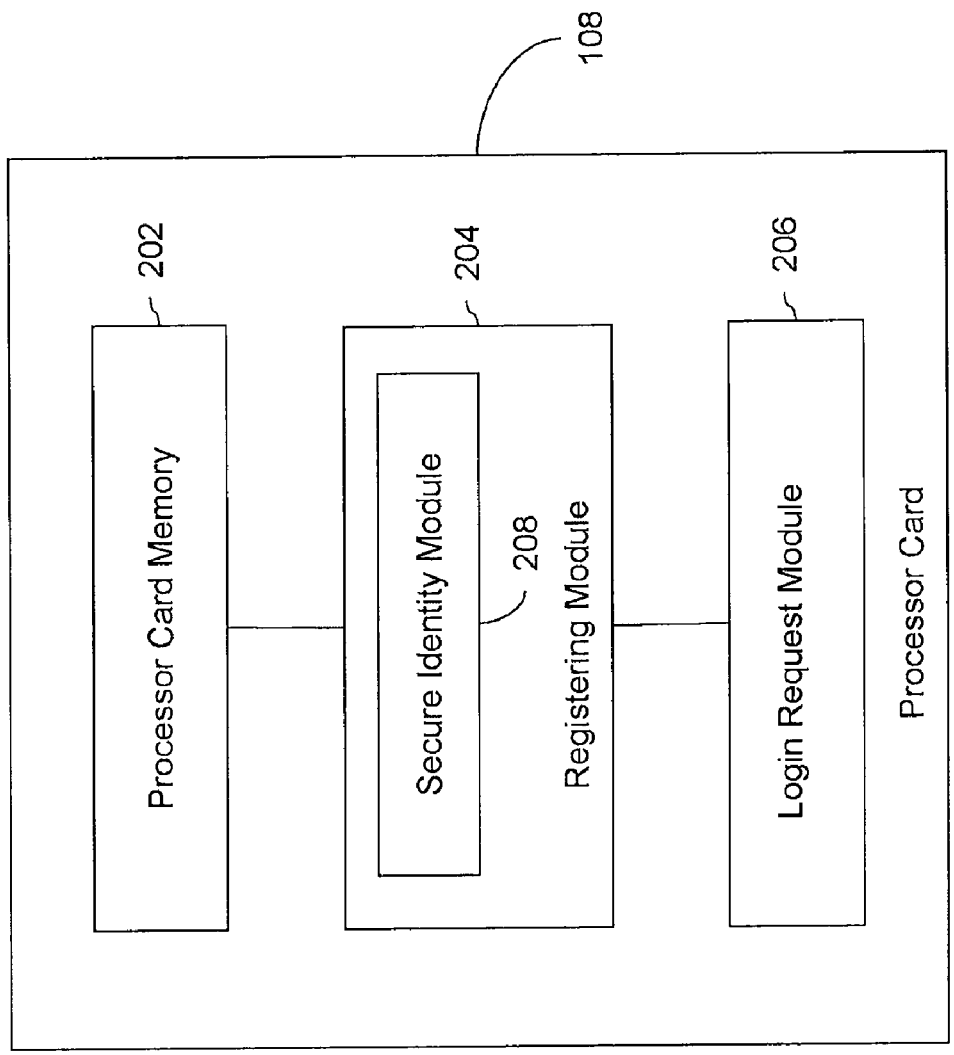
FIG. 2 is a block diagram of a processor card, in accordance with an exemplary embodiment of the invention.

FIG. 2 is a block diagram of processor card 108, in accordance with an exemplary embodiment of the invention.

Processor card 108 includes a processor card memory 202, a registering module 204 and a login request module 206. Registering module 204 includes a secure identity module 208.

Processor card memory 202 securely stores various security parameters. In various embodiments of the invention, these security parameters include a secure key of server 102 used for encoding, the secret codes of server 102, a unique codes for user identification, and the like. Processor card memory 202, in addition to storing the security parameters, also stores the identification details of processor card 108.

In various embodiments of the invention, processor card memory 202 may be segmented into a secure non-volatile memory, a secure volatile memory and a non-secure volatile memory. In an embodiment of the invention, the security parameters and the identification details are stored in the secure non-volatile memory of processor card 108.

Registering module 204 enables a user to enter the first user-preferred information in processor card 108 through data processing unit 106. This first user-preferred information is stored as the login details of the user in processor card memory 202. Registering module 204 includes secure identity module 208 for generating a secure identity of the user. Secure identity module 208 generates the secure identity of the user based on the security parameters, the identification details and the login details stored in processor card memory 202. The secure identity generated by secure identity module 208 is also stored in processor card memory 202. In an embodiment of the invention, the secure identity may be stored in the secure volatile memory of processor card 108.

Registering module 204 also enables the user to change the login details stored in processor card memory 202. A second user-preferred information can be entered in processor card 108 to be stored as the updated login details of the user in processor card memory 202. In various embodiment of the invention, the user can update the login details that are stored in processor card memory 202 by entering the login details valid at that time, and a second user-preferred information.

Login request module 206 generates a dynamic login request each time the user wants to access server 102. Login request module 206 generates a dynamic login request after receiving the login details from the user and validating them with the login details that are stored in processor card memory 202. The dynamic login request is generated based on the security parameters and identification details stored in processor card memory 202; and is also dependent upon the time at which it is generated. This dynamic request is used to authenticate the user with server 102.

Figure 3:
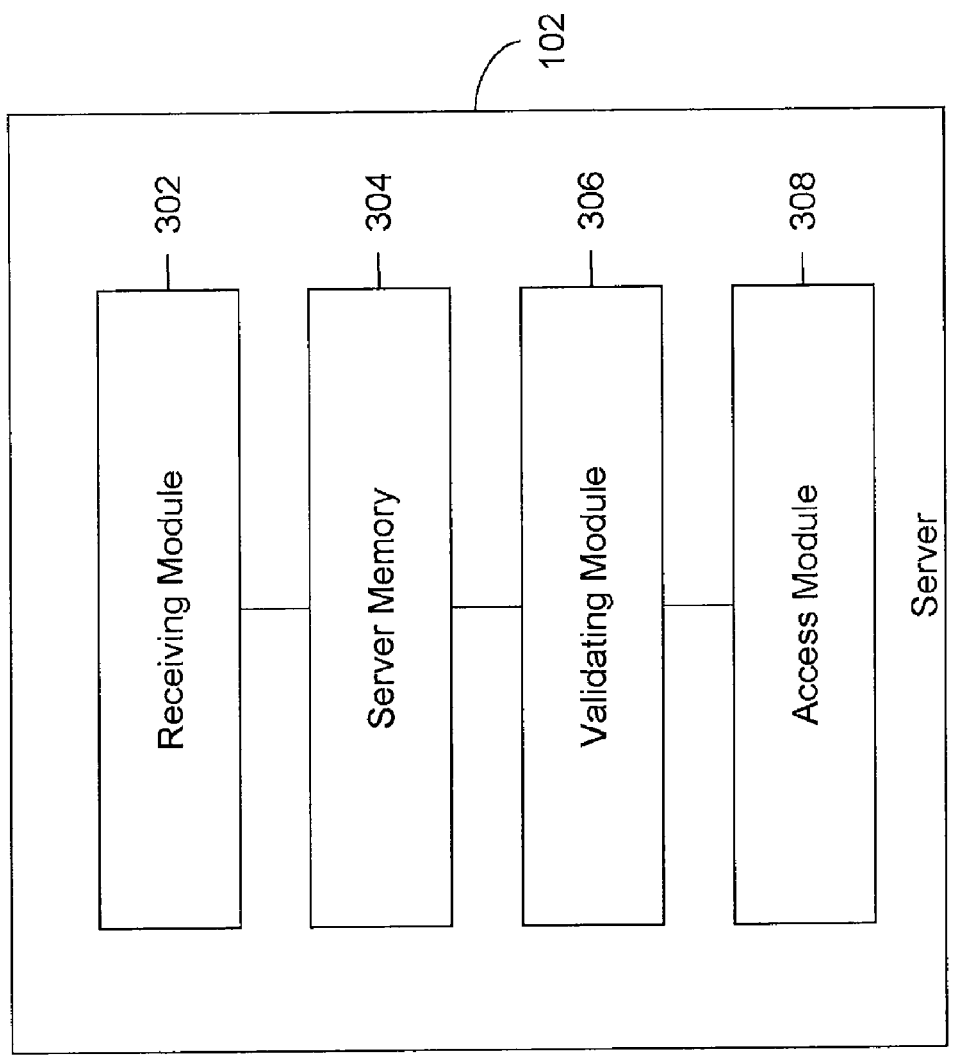
FIG. 3 is a block diagram of a server, in accordance with an exemplary embodiment of the invention.

FIG. 3 is a block diagram of server 102, in accordance with an exemplary embodiment of the invention. Server 102 includes a receiving module 302, a server memory 304, a validating module 306 and an access module 308.

Receiving module 302 receives a dynamic login request from a user using processor card 108. The dynamic login request is received for enabling the user to access server 102. Receiving module 302 also receives the secure identity of the user and the identification details of processor card 108. Further, receiving module 302 receives the time at which the dynamic login request was generated by processor card 108.

Server memory 304 stores the security parameters of server 102 and the identification details of processor card 108. In an embodiment of the invention, server 102 maintains the security parameters against the identification details of various processor cards. Validating module 306 validates the secure identity and the dynamic login request based on the security parameters stored in server memory 304. Further, the dynamic login request is also validated based on its time validity. The time validity is the time for which the dynamic login request remains valid. In an embodiment of the invention, the time validity of the dynamic login request is time interval for which the dynamic login request remains valid from its time of generation. In an embodiment of the invention, the time interval may be pre-defined for the server. In various embodiment of the invention, the time interval may vary in accordance with the requirements of server 102.

Access module 308 enables the user to access server 102 upon the validation of the dynamic login request sent by the user.

Figure 4:
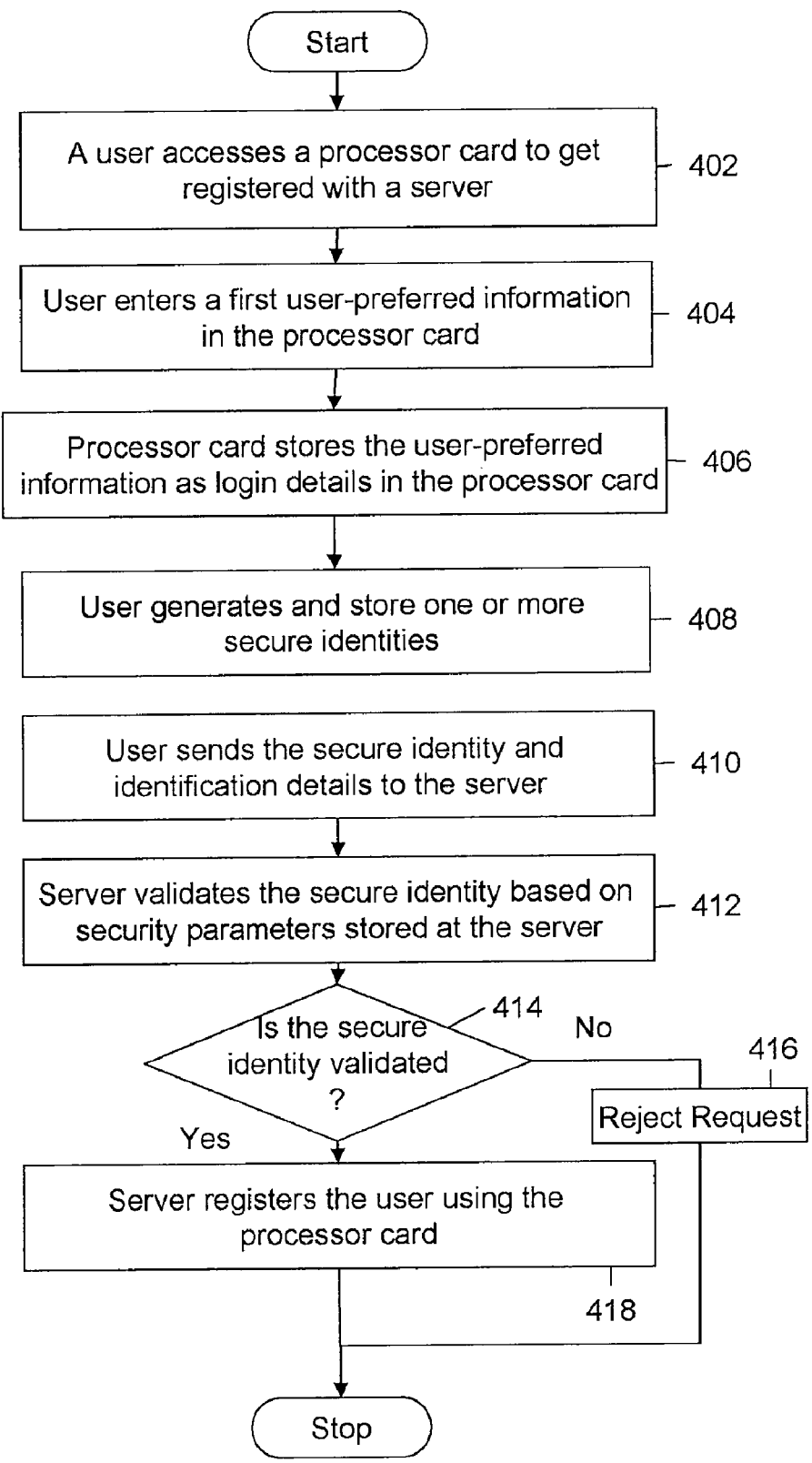
FIG. 4 is a flowchart of a method for registering a user with a server, in accordance with an exemplary embodiment of the invention.

FIG. 4 is a flowchart of a method for registering a user with a server, in accordance with an exemplary embodiment of the invention. In various embodiments of the invention, the user registers with the server using a processor card. This processor card includes the security parameters of the server and the identification details of the processor card.

At 402, the user accesses the processor card, such as processor card 108 to register with the server, such as server 102. The processor card contains the security parameters of the server and its own identification details. In an embodiment of the invention, the security parameters of the server may be an encryption key, a code used for encoding, a unique code of the server, and the like. In various embodiments of the invention, the identification details of the processor card may be a unique code assigned to the processor card, such as a sixteen digit code. The unique code may include integers, alphanumeric characters, and the like.

At 404, the user enters a first user-preferred information in the processor card. The first user-preferred information is defined by the user, using which he wants to register with the server. In an embodiment of the invention, the first user-preferred information may include alphanumeric characters, different letters of the alphabet, numeric values and the like.

At 406, the first user-preferred information is stored as the login details of the user in the processor card. These login details are stored securely in the processor card. In an embodiment of the invention, the login details are stored in the secure volatile memory of the processor card. In various embodiments of the invention, the login details are used by the user to access the processor card at the time of authentication, and thereby access the server. This will be described in detail in conjunction with FIG. 5.

At 408, a secure identity of the user is generated by the processor card. The secure identity is generated based on the login details of the user, the security parameters of the server stored at the processor card, and its identification details. In various embodiments of the invention, the processor card generates a secure identity of the user by using the details stored in its memory. In an embodiment of the invention, the processor card generates the secure identity by computing the hash functions of the login details, the security parameters and the identification details. This process of generation of the secure identity will be apparent to any person who is skilled in the art.

At 410, the user sends the secure identity generated by the processor card to the server over a public network. Further, the user also sends the identification details of the processor card to the server. In an embodiment of the invention, the public network may be the Internet, an intranet, a LAN, a WAN, a WLAN and the like. In an embodiment of the invention, the user receives the secure identity from the processor card and sends it to the server through a data processing unit, such as data processing unit 106. In another embodiment of the invention, the processor card is configured to send the secure identity to the server.

At 412, the server checks the secure identity based on the security parameters that are stored at the server, upon receiving the secure identity generated by the processor card and the identification details of the processor card. In various embodiments of the invention, the security parameters stored at the server include the secure key of the server used for decoding; the secret codes of the server and the unique codes stored against the identification details of the processor for user identification. The server maintains the security parameters against the identification details of the processor card.

At 414, it is checked whether the secure identity is valid. The validity of the secure identity is determined based on 412. If the secure identity is found to be invalid, 416 is performed. At 416, the registration process of the user fails and the process is terminated.

If the secure identity is found to be valid at 414, 418 is performed. At 418, the user is registered with the server using the login details being stored in the processor card.

Figure 5:
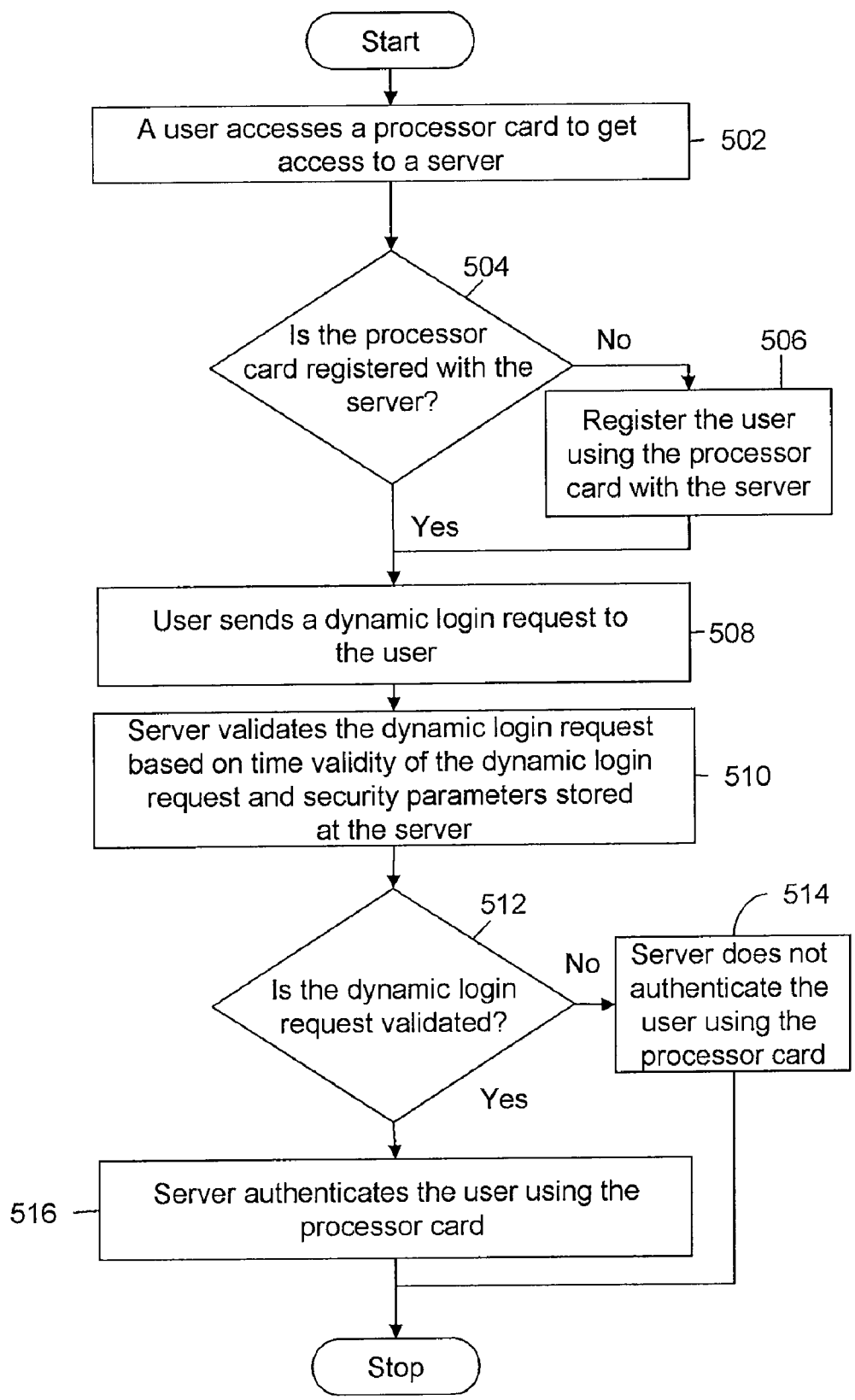
FIG. 5 is a flowchart of a method of authenticating a user with a server over a public channel, in accordance with an exemplary embodiment of the invention.

FIG. 5 is a flowchart of a method of authenticating a user with a server over a public channel, in accordance with an exemplary embodiment of the invention.

At 502, the user accesses a processor card to get access to the server. In various embodiments of the invention, the processor card includes the security parameters of the server that is required to be accessed, and its own identification details.

At 504, it is checked whether the user is already registered with the server using the processor card. If the user has been already registered with the server, 508 is performed. If the user has not been already registered with the server, he is registered with the server at 506.

The registration process of the user has been explained in detail in conjunction with FIG. 4. During the registration, the login details of the user and the secure identity are stored in the processor card.

Thereafter at 508, the server receives a dynamic login request from the user, using the processor card, over a public network. The dynamic login request is generated by the processor card upon receiving the login details by the user. In various embodiments of the invention, the public network may be the Internet, an intranet, a LAN, a WAN, a WLAN, and the like.

In various embodiments of the invention, the processor card generates the dynamic login request by using the details stored in its memory. In an embodiment of the invention, the processor card generates the dynamic login request by computing the hash functions of the login details, the security parameters and the time at which the dynamic login request is generated. This process of generation of the dynamic login request will be apparent to any person who is skilled in the art.

The user sends the dynamic login request by using a data processing unit to the server for authentication.

In another embodiment of the invention, the server receives the secure identity, identification details of the processor card and the time at which the dynamic login request was generated over a public network from the user by using the processor card. The generation of the secure identity is explained in detail in conjunction with FIG. 4.

At 510, the server checks the dynamic login request. The dynamic login request is checked on the basis of the security parameters present at the server. Further, the server also checks the dynamic login request based on its time validity. The time validity of the dynamic login request is the time interval for which the dynamic login request remains valid from its time of generation. In an embodiment of the invention, the time interval may be pre-defined for the server. In various embodiment of the invention, the time interval may vary in accordance with the requirements of the server.

At 512, it is checked whether the dynamic login request is valid. If the dynamic login request is not found to be valid at 512, the dynamic login request is rejected at 514, and the user is not authenticated to access the server.

If the dynamic login request is found to be valid at 512, 516 is performed. At 516, user is authenticated by the server and provided an access to the server.

Figure 6:
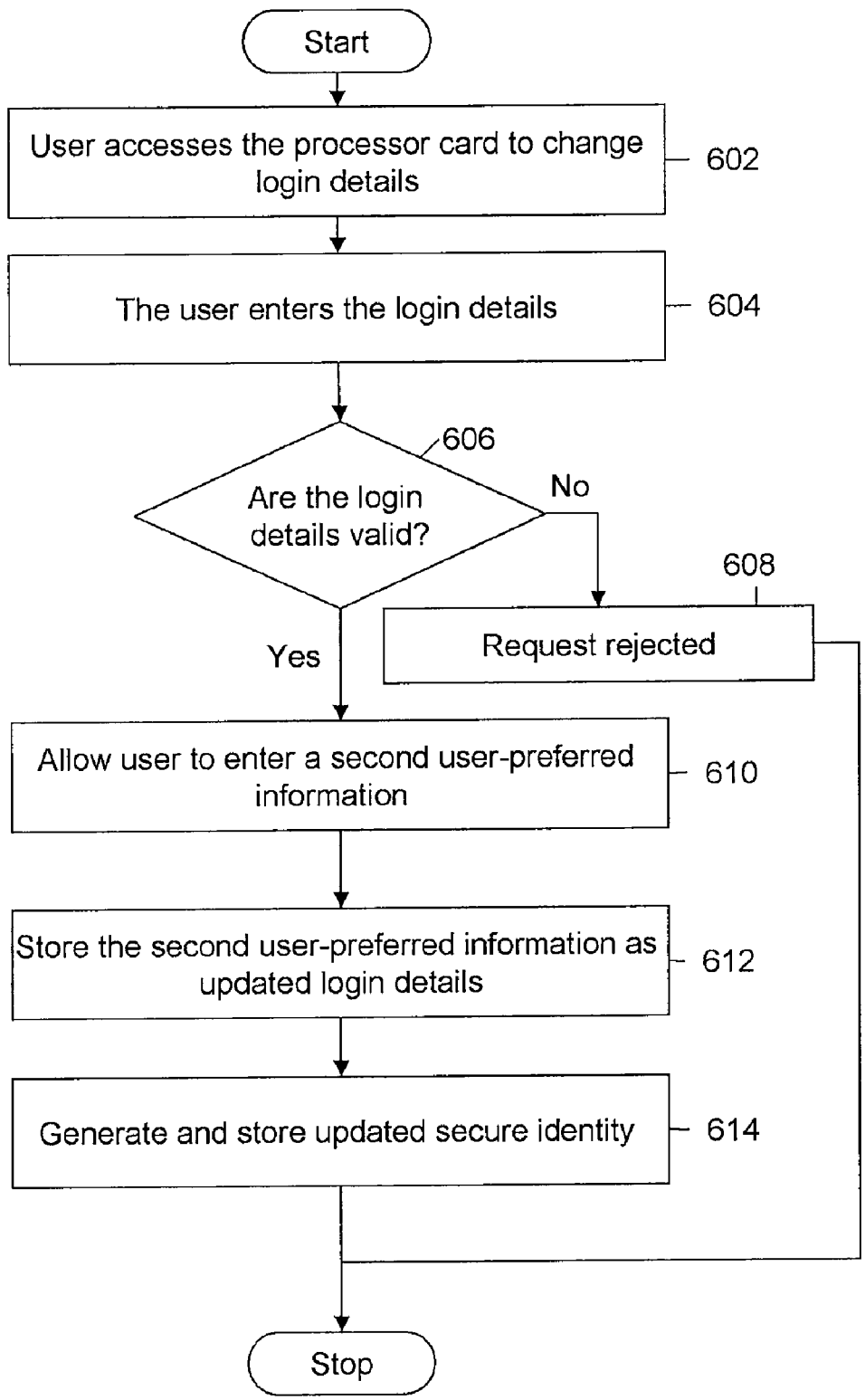
FIG. 6 is a flowchart of a method for enabling user to change login details, in accordance with an exemplary embodiment of the invention.

FIG. 6 is a flowchart of a method for enabling a user to change the login details, in accordance with an exemplary embodiment of the invention.

At 602, the user accesses a processor card to change the login details stored in the processor card. In various embodiments of the invention, the user accesses the processor card by entering a unique code of the processor card.

At 604, the user enters the login details in order to update the login details stored in the processor card. At 606, it is checked whether the entered login details are valid. If the login details are not found to be valid by the processor card, the user is not allowed to change the login details and the request is terminated at 608.

If the login details are found to be valid by the processor card at 606, 610 is performed. At 610, the user is allowed to enter a second user-preferred information to update the login details.

In an embodiment of the invention, the processor card may allow the user to enter the login details repeatedly, if the login details entered at 604 are invalid. These repetitions are only allowed as pre-defined in the processor card.

At 612, the second user-preferred information is stored as the updated login details in the processor card. In an embodiment of the invention, the updated login details are stored in a secure volatile memory of the processor card.

At 614, the processor card updates the stored secure identity of the user. The new secure identity is generated based on the identification details of the processor card and the login details updated at 612. In an embodiment of the invention, the processor card generates the updated secure identity by computing the hash functions of the updated login details, the security parameters and the identification details. This process of generation of the secure identity will be apparent to any person who is skilled in the art.

Thereafter, the processor card stores the updates the updated secure identity in the processor card memory.

It will be apparent to any person skilled in the art that the user may change the login details any number of times.

The method, system and computer program product described above have a number of advantages. The method helps in registering the user using a processor card with a server. The method enables the user to use his preference for creating his login details. Further, the method authenticates the user with the server over a public network without extensive use of resources of the server. The method avoids forgery attack as the dynamic login request generated by the processor card is generated based on the secret parameters of the server. The secret parameters are stored securely in the processor card. Therefore, it becomes quite difficult for an unauthorized person to intercept the dynamic login request.

The method also eliminates the occurrence of replay attacks as the server checks for the time validity of the dynamic login request. The method also obviates the guessing attack by sending the dynamic login request in the form of a hash function. The method avoids insider attacks as the login details are created by the user and the server does not maintain these login details. Further, the method allows user to change the login details without getting authenticated with the server, thereby reducing the computational load on the server.

The computer system comprises a computer, an input device, a display unit and the Internet. The computer comprises a microprocessor, which is connected to a communication bus. Further, the computer includes a memory, which may include Random Access Memory (RAM) and Read Only Memory (ROM). The computer system also comprises a storage device, which can be a hard disk drive or a removable storage drive such as a floppy disk drive, an optical disk drive, etc. Moreover, the storage device can be other similar means for loading computer programs or other instructions into the computer system. Further, the computer system includes a communication unit, which enables the computer to connect to other databases and the Internet through an I/O interface. Furthermore, the communication unit enables the transfer and reception of data from other databases. The communication unit may include a modem, an Ethernet card, or any other similar device that enables the computer system to connect to databases and networks such as LAN, MAN, WAN and the Internet. The computer system facilitates inputs from a user through an input device that is accessible to the system through an I/O interface.

The computer system executes a set of instructions that is stored in one or more storage elements, to process input data. The storage elements may also hold data or other information, as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program, or a portion of a program module, as in the present invention. The software may also include modular programming in the form of object-oriented programming. Processing of input data by the processing machine may be in response to users commands, the result of previous processing, or a request made by an alternative processing machine.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for registering a user with a server using a processor card, the processor card having one or more security parameters of the server and one or more identification details of the processor card, the method comprising:
   a. entering a first user-preferred information in the processor card, the first user-preferred information being stored as login details of the user in the processor card;
   b. generating a secure identity, the secure identity being generated by using the processor card, the secure identity being stored in the processor card; and
   c. sending the secure identity and the one or more identification details of the processor card to the server, wherein the server registers the user upon receiving the secure identity and the one or more identification details of the processor card and validating the secure identity based on one or more security parameters stored at the server;
   wherein the secure identity is generated by using at least one of the login details, the one or more security parameters of the server and the one or more identification details of the processor card.

2. The method according to claim 1 further comprising changing the login details stored in the processor card by entering a second user-preferred information in the processor card.

3. The method according to claim 1 further comprising accessing the processor card through a processor card reader, the processor card reader being accessed for the one or more identification details of the processor card and the secure identity.

4. A method for authenticating a user with a server over a public network, the user using a processor card for authentication, the user registering using the processor card with the server, the user being registered using a first user- preferred information, wherein the first user-preferred information being stored as login details of the user in the processor card, the processor card having one or more security parameters of the server and one or more identification details of the processor card, the method comprising:
   a. receiving a dynamic login request, the dynamic login request being generated by the processor card on receiving the login details from the user after registration, wherein the dynamic login request is received by the server; and
   b. validating the dynamic login request by the server based on time-validity of the dynamic login request and one or more security parameters stored at the server, wherein the time-validity of the dynamic login request is the time interval for which the dynamic login request remains valid.

5. The method according to claim 4 further comprising receiving a secure identity, the secure identity being generated based on the login details, the one or more security parameters and the one or more identification details of the processor card.

6. The method according to claim 4, wherein the dynamic login request is generated by the processor card based on the one or more security parameters stored in the processor card.

7. The method according to claim 4 further comprising receiving the one or more identification details of the processor card.

8. The method according to claim 4 further comprising receiving the time at which the dynamic login request is generated by the processor card.

9. The method according to claim 4 further comprising enabling the user to access the server upon validation of the dynamic login request.

10. A processor card for authenticating a user with a server over a public network, the processor card comprising:
   a. a processor card memory, the processor card memory configured for storing one or more security parameters of the server and one or more identification details of the processor card;
   b. a registering module, the registering module configured for accepting a first user-preferred information from the user, wherein the first user-preferred information is stored as login details of the user in the processor card memory; and
   c. a login request module, the login request module configured for generating a dynamic login request for accessing the server, the dynamic login request being generated on receiving the login details from the user, the dynamic login request being generated based on at least one of the one or more security parameters and the one or more identification details, wherein the server authenticates the user upon validation of the dynamic login request;
   wherein the registering module is further configured for enabling the user to change the login details stored in the processor card.

11. The processor card according to claim 10, wherein the registering module further comprises a secure identity module, the secure identity module configured for generating a secure identity, the secure identity being generated based on at least one of the one or more security parameters, the one or more identification details and the login details.

12. A server for authenticating a user over a public network, the user using a processor card for authentication, the user sending a dynamic login request for accessing the server, the server comprising:
   a. a receiving module, the receiving module configured for receiving the dynamic login request;
   b. a server memory, the server memory configured for storing at least one of one or more security parameters of the server and one or more identification details of the processor card; and
   c. a validating module, the validating module configured for validating the dynamic login request based on at least one of time-validity of the dynamic login request and one or more security parameters stored in the server memory, wherein the time-validity of the dynamic login request is the time interval for which the dynamic login request remains valid;
   wherein the receiving module is further configured for receiving a secure identity, wherein the secure identity is generated by using at least one of the login details, the one or more security parameters of the server and the one or more identification details of the processor card.

13. The server according to claim 12, wherein the receiving module is further configured for receiving one or more identification details of the processor card.

14. The server according to claim 12, wherein the receiving module is further configured for receiving the time at which the dynamic login request is generated by the processor card.

15. The server according to claim 12 further comprising an access module, the access module configured for enabling the user to access the server upon validation.

16. A computer program product for use with a computer, the computer program product comprising a computer usable medium having a computer readable program code embodied therein for authenticating a user with a server over a public network, the user using a processor card for authentication, the processor card having one or more security parameters of the server and one or more identification details of the processor card, the computer readable program code performing:
   a. registering the user using the processor card with the server, the user being registered using a first user-preferred information, wherein the first user-preferred information being stored as login details of the user in the processor card;
   b. receiving a dynamic login request, the dynamic login request being generated by the processor card on receiving the login details from the user after registration, wherein the dynamic login request is received by the server; and
   c. validating the dynamic login request by the server based on at least one of time-validity of the dynamic login request and one or more security parameters stored at the server, wherein the time-validity of the dynamic login request is the time interval for which the dynamic login request remains valid;
   wherein the computer readable program code further performs receiving a secure identity, the secure identity being generated based on the login details, the one or more security parameters and the one or more identification details of the processor card.

17. The computer program product according to claim 16, wherein the dynamic login request is generated by the processor card based on the one or more security parameters stored in the processor card.

18. The computer program product according to claim 16, wherein the computer readable program code further performs receiving the one or more identification details of the processor card.

19. The computer program product according to claim 16, wherein the computer readable program code further performs receiving the time at which the dynamic login request is generated by the processor card.

20. The computer program product according to claim 16, wherein the computer readable program code further performs enabling the user to access the server upon validation of the dynamic login request.

* * * * *